(12) United States Patent
Takase et al.

(10) Patent No.: US 9,182,548 B2
(45) Date of Patent: Nov. 10, 2015

(54) OPTICAL WAVEGUIDE PRODUCTION METHOD

(75) Inventors: Mayu Takase, Ibaraki (JP); Kazunori Mune, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 925 days.

(21) Appl. No.: 13/337,403

(22) Filed: Dec. 27, 2011

(65) Prior Publication Data

US 2012/0175794 A1 Jul. 12, 2012

(30) Foreign Application Priority Data

Jan. 7, 2011 (JP) ................... 2011-002011
Oct. 25, 2011 (JP) ................... 2011-233918

(51) Int. Cl.
*B29D 11/00* (2006.01)
*G02B 6/138* (2006.01)
*G02B 6/122* (2006.01)

(52) U.S. Cl.
CPC .............. *G02B 6/138* (2013.01); *G02B 6/1221* (2013.01); *B29D 11/00663* (2013.01)

(58) Field of Classification Search
USPC ................................... 264/1.1, 1.27, 1.24, 2.7
IPC ................ G02B 6/138,6/1221; B28D 11/00663
See application file for complete search history.

(56) References Cited

U.S. PATENT DOCUMENTS

| 2008/0274273 A1 | 11/2008 | Khan |
| 2009/0022466 A1 | 1/2009 | Khan |
| 2009/0103873 A1 | 4/2009 | Fujii et al. |

FOREIGN PATENT DOCUMENTS

| CN | 101334505 A | 12/2008 |
| CN | 101349781 A | 1/2009 |
| JP | 2001-074953 A | 3/2001 |
| JP | 2001-074963 A | 3/2001 |
| JP | 2001-091775 A | 4/2001 |
| JP | 2005-215054 A | 5/2005 |

(Continued)

OTHER PUBLICATIONS

Chinese Office Action dated Aug. 8, 2014, issued in corresponding Chinese Application No. 201110433890.1; w/ English translation (14 pages).

(Continued)

*Primary Examiner* — Mathieu Vargot
(74) *Attorney, Agent, or Firm* — Westerman, Hattori, Daniels & Adrian, LLP (57) ABSTRACT

A plurality of regions for a plurality of optical waveguides are defined on a substrate. Then, optical waveguide under-cladding layers are formed on the respective regions, and dummy under-cladding layers are formed between adjacent ones of the optical waveguide under-cladding layers in a spaced relationship to the optical waveguide under-cladding layers. After cores are formed on the optical waveguide under-cladding layers and the dummy under-cladding layers, an over-cladding layer formation photosensitive resin is applied on the resulting substrate. Subsequently, portions of the resulting photosensitive resin layer for the respective optical waveguides are selectively exposed, and the exposed portions are defined as over-cladding layers. Thus, the optical waveguides are produced as each including the optical waveguide under-cladding layer, the core and the over-cladding layer, and separated from the substrate.

7 Claims, 6 Drawing Sheets

(56) References Cited

FOREIGN PATENT DOCUMENTS

| | | | |
|---|---|---|---|
| JP | 2008-122685 | A | 5/2008 |
| JP | 2008-203694 | A | 9/2008 |
| JP | 2009-25385 | A | 2/2009 |
| JP | 20101266677 | A | 11/2010 |

OTHER PUBLICATIONS

Office Action dated Apr. 14, 2015, issued in corresponding Japanese application No. 2011-233918, with English translation. (6 pages).

Chinese Office Action dated Mar. 30, 2015, issued in corresponding CN Patent Application No. 201110433890.1 with English translation (10 pages).

RELATED ART

FIG. 6B

RELATED ART

FIG. 6C

RELATED ART

FIG. 6D

RELATED ART

OPTICAL WAVEGUIDE PRODUCTION METHOD

BACKGROUND OF THE INVENTION

1. Field of the Invention

The present invention relates to a production method of an optical waveguide to be widely used for optical communications, optical information processing, and other general optics.

2. Description of the Related Art

Optical waveguides are typically incorporated in optical devices such as optical waveguide devices, optical integrated circuits and optical wiring boards to be widely used for optical communications, optical information processing and other general optics. Such an optical waveguide typically includes an under-cladding layer, cores of a predetermined projection pattern provided as light paths on an upper surface of an under-cladding layer, and an over-cladding layer covering the cores.

Figure 6A:
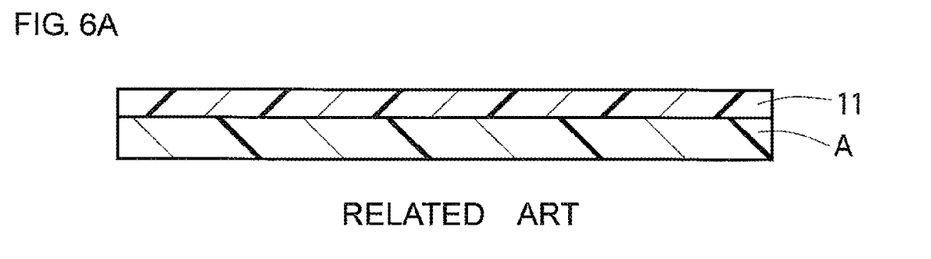
FIGS. 6A to 6D are schematic diagrams for explaining a conventional optical waveguide production method.
Figure 6B:
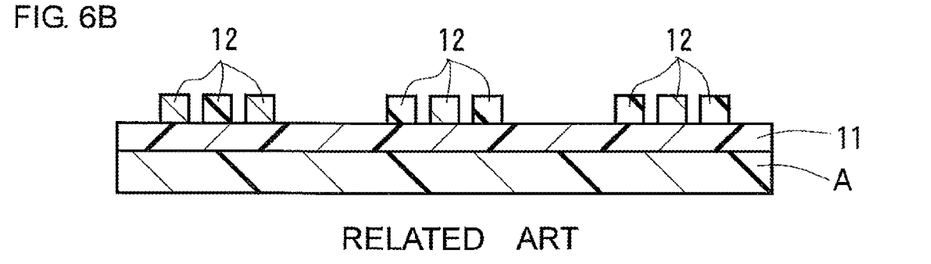
Figure 6C:
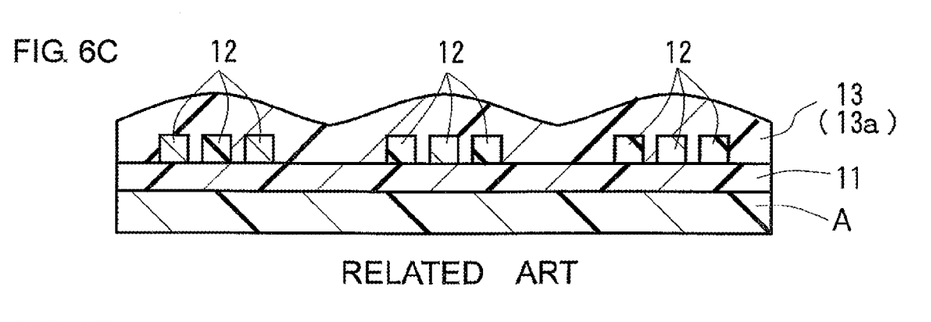
Figure 6D:
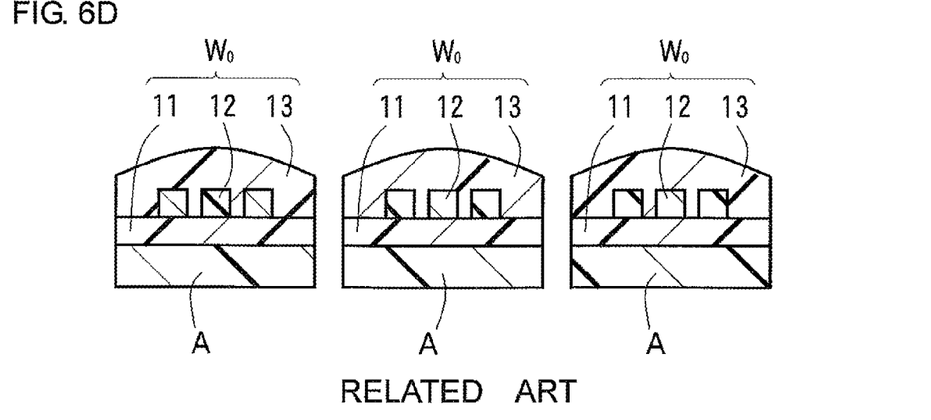

The following production method is proposed as an optical waveguide production method to be employed, for example, for simultaneously producing a plurality of optical waveguides (see, for example, JP-A-2008-203694). First, as shown in FIG. 6A, a single under-cladding layer 11 having an area sufficient to accommodate a plurality of optical waveguides $W_0$ (see FIG. 6D) is formed on a substrate A. Then, as shown in FIG. 6S, a plurality of regions for the plurality of optical waveguides $W_0$ are defined on an upper surface of the under-cladding layer 11, and cores 12 are formed in a predetermined projection pattern on each of the regions. In turn, as shown in FIG. 6C, a liquid curable resin (a photosensitive resin or a thermosetting resin) is applied as a material for an over-cladding layer 13 on the entire upper surface of the under-cladding layer as covering the cores 12, and then the resulting coating layer 13a is cured, whereby the over-cladding layer 13 is formed. Thus, the optical waveguides $W_0$ each including the under-cladding layer 11, the cores and the over-cladding layer 13 are formed in a combined state on the substrate A. Further, as shown in FIG. 6D, the resulting substrate A is cut along boundaries between the optical waveguides $W_0$ by a rotary blade or the like. Thereafter, the optical waveguides $W_0$ are each separated from the substrate A. Thus, the optical waveguides $W_0$ are produced.

In the optical waveguide production method, however, the coating layer 13a formed by applying the liquid curable resin for the formation of the over-cladding layer (see FIG. 6C) has a greater thickness on core formation areas in which the cores 12 are formed, and has a smaller thickness on areas in which the cores 12 are not formed between adjacent ones of the optical waveguides $W_0$ and, in this state, the coating layer 13a is cured. Therefore, the over-cladding layer 13 has an undulated upper surface. If an optical waveguide $W_0$ including an over-cladding layer 13 having a non-planar upper surface is connected to a connector, it is difficult to fix a smaller thickness portion of the optical waveguide $W_0$ to the connector, so that the optical waveguide $W_0$ and the connector are liable to be misaligned. This exacerbates a connection loss occurring when the optical waveguide $W_0$ is connected to the connector. In FIG. 6C, the undulated upper surface of the over-cladding layer 13 is illustrated with exaggeration for easy understanding.

Proposed approaches to planarization of the upper surface of the over-cladding layer 13 are to polish the upper surface and to form another layer on the upper surface (see, for example, JP-A-2001-74953, JP-A-2001-74963 and JP-A-2001-91775).

However, the planarization of the upper surface of the over-cladding layer 13 requires additional steps, i.e., the step of polishing the upper surface and the step of forming another layer on the upper surface, thereby reducing the productivity. Further, the optical waveguides $W_0$ often each have a complicated overall shape depending on their applications. This makes it difficult to separate the optical waveguides $W_0$ from each other by cutting with the rotary blade or the like, thereby reducing the productivity.

SUMMARY OF THE INVENTION

An optical waveguide production method is provided in which a plurality of optical waveguides can be simultaneously produced as each including a planar surface over-cladding layer at higher productivity.

There is provided an optical waveguide production method for producing a plurality of optical waveguides, the method including the steps of: defining a plurality of regions for the plurality of optical waveguides on a substrate; forming optical waveguide under-cladding layers on the respective regions and forming dummy under-cladding layers between adjacent ones of the optical waveguide under-cladding layers in a spaced relationship to the optical waveguide under-cladding layers through application and exposure of an under-cladding layer formation photosensitive resin; forming cores on the optical waveguide under-cladding layers and the dummy under-cladding layers through application and exposure of a core formation photosensitive resin; applying an over-cladding layer formation photosensitive resin over the cores to form a photosensitive resin layer; selectively exposing portions of the photosensitive resin layer for the respective optical waveguides and defining the exposed portions as over-cladding layers, whereby the optical waveguides are formed, each including the optical waveguide under-cladding layer, the core and the over-cladding layer on the substrate; and selectively separating the optical waveguides from the substrate.

In the inventive optical waveguide production method, the regions for the respective optical waveguides are defined on the substrate. Then, the optical waveguide under-cladding layers are formed on the respective regions, and the dummy under-cladding layers are formed between the adjacent ones of the optical waveguide under-cladding layers in spaced relation. Therefore, the dummy under-cladding layers are present on the substrate when the core formation photosensitive resin is applied on the resulting substrate. Thus, a coating layer of the core formation photosensitive resin is formed as having a planar upper surface without the possibility that the coating layer is recessed above the dummy under-cladding layers. Thus, the cores are formed in a predetermined pattern as having a uniform height through the exposure.

When the over-cladding layer formation photosensitive resin is applied over the cores after the formation of the cores, the dummy under-cladding layers and the cores formed on the dummy under-cladding layers are present on the substrate. Therefore, the resulting photosensitive resin layer is formed as having a planar upper surface without the possibility that the photosensitive resin layer is recessed. Thus, the over-cladding layers formed by selectively exposing the photosensitive resin layer each have a planar upper surface. This eliminates the need for the polishing step or the like required in the prior art for the planarization of the upper surface of the over-cladding layer, thereby improving the productivity.

In the inventive optical waveguide production method, as described above, the optical waveguides are respectively produced on the regions defined on the substrate. Therefore, the optical waveguides can be individually provided by separating the optical waveguides from the substrate. That is, the inventive optical waveguide production method does not require the cutting step for individually providing the optical waveguides. This also improves the productivity. In addition, even if the optical waveguides each have a complicated shape, the optical waveguides can be individually provided simply by separating the optical waveguides from the substrate. Thus, the productivity is not reduced due to the shape of the optical waveguides.

Further, the inventive optical waveguide production method obviates the need for the polishing step for the planarization of the upper surface of the over-cladding layer described above and for the cutting step for providing the individual optical waveguides, thereby eliminating the possibility that polishing dust and cutting debris are generated to adhere to the optical waveguides. Therefore, the inventive optical waveguide production method is free from reduction in reliability of the optical waveguides.

In the inventive optical waveguide production method, the regions for the respective optical waveguides are defined on the substrate. Then, the optical waveguide under-cladding layers are respectively formed on the regions, and the dummy under-cladding layers are formed between the adjacent ones of the optical waveguide under-cladding layers in spaced relation to the optical waveguide under-cladding layers. In the presence of the dummy under-cladding layers, the coating layer of the core formation photosensitive resin is formed as having a planar upper surface on the resulting substrate, so that the cores can be formed on the upper surfaces of the optical waveguide under-cladding layers and the dummy under-cladding layers as having an even height. In the presence of the dummy under-cladding layers and the cores formed on the upper surfaces of the dummy under-cladding layers, the over-cladding layer formation photosensitive resin layer is formed as having a planar upper surface on the resulting substrate, so that the over-cladding layers can be formed as each having a planar upper surface. This obviates the need for the polishing step or the like required in the conventional art for the planarization of the upper surfaces of the over-cladding layers, thereby improving the productivity. In the inventive optical waveguide production method, as described above, the optical waveguides are produced on the respective regions defined on the substrate. Therefore, the optical waveguides can be individually provided simply by separating the optical waveguides from the substrate without the need for the cutting. Even if the optical waveguides are complicated in shape, the productivity is not reduced due to the shape of the optical waveguides. Further, as described above, the inventive optical waveguide production method obviates the need for the polishing step for the planarization of the upper surfaces of the over-cladding layers and for the cutting step for providing the individual optical waveguides, thereby eliminating the possibility that the polishing dust and the cutting debris are generated to adhere to the optical waveguides. Therefore, the optical waveguides can be produced as having excellent reliability.

Particularly, where the dummy under-cladding layers are each spaced not greater than 300 μm from an adjacent one of the optical waveguide under-cladding layers, the planarity of the upper surface of the core formation photosensitive resin coating layer and hence the planarity of the upper surface of the over-cladding layer formation photosensitive resin layer are improved because of the sufficiently small spacing between the optical waveguide under-cladding layers and the dummy under-cladding layers. Thus, the planarity of the upper surfaces of the over-cladding layers is improved. Where such an optical waveguide is connected to a connector, therefore, the optical waveguide can be stably fixed to the connector, and the optical waveguide and the connector are less liable to be misaligned. This reduces the connection loss when the optical waveguide is connected to the connector.

Where a plurality of cores are formed on the upper surface of each of the dummy under-cladding layers, a space between adjacent ones of the plurality of cores is suitably adjusted. Thus, the planarity of the upper surface of the over-cladding layer formation photosensitive resin layer and hence the planarity of the upper surface of the over-cladding layer is improved. This reduces the connection loss when such an optical waveguide is connected to a connector.

Where the optical waveguide under-cladding layers and the dummy under-cladding layers are formed in the same step, the productivity can be further improved.

DETAILED DESCRIPTION OF THE INVENTION

An embodiment of the present invention will hereinafter be described in detail with reference to the attached drawings.

Figure 2A:
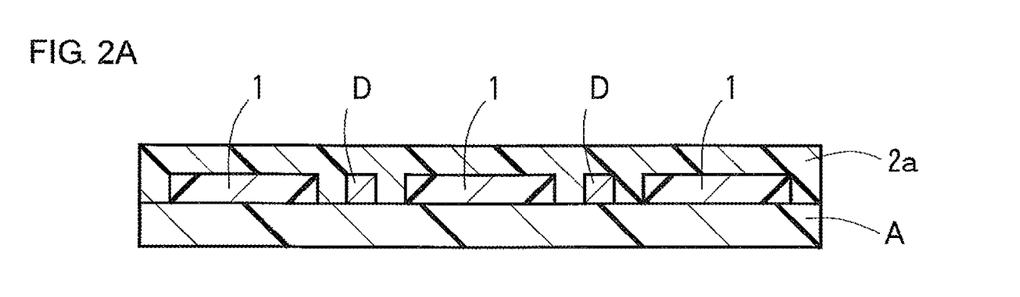
FIGS. 2A to 2C are schematic diagrams for explaining how to form cores in the optical waveguide production method according to the embodiment.
Figure 2B:
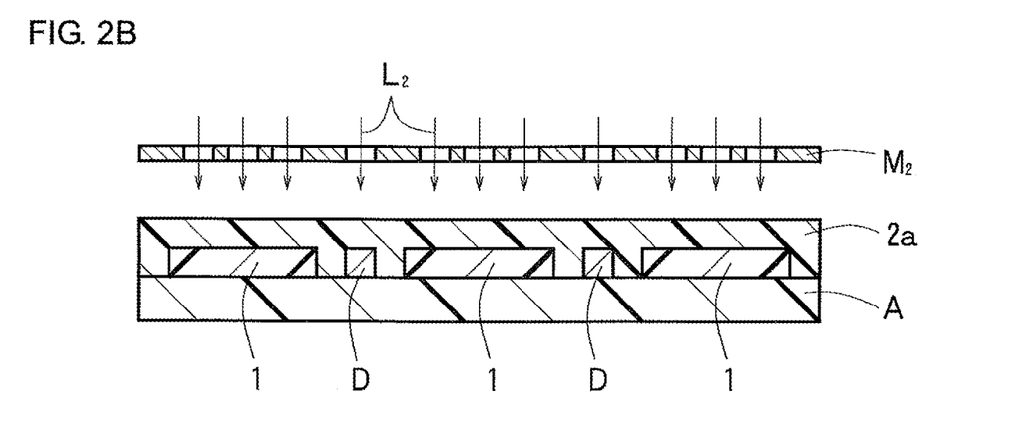
Figure 2C:
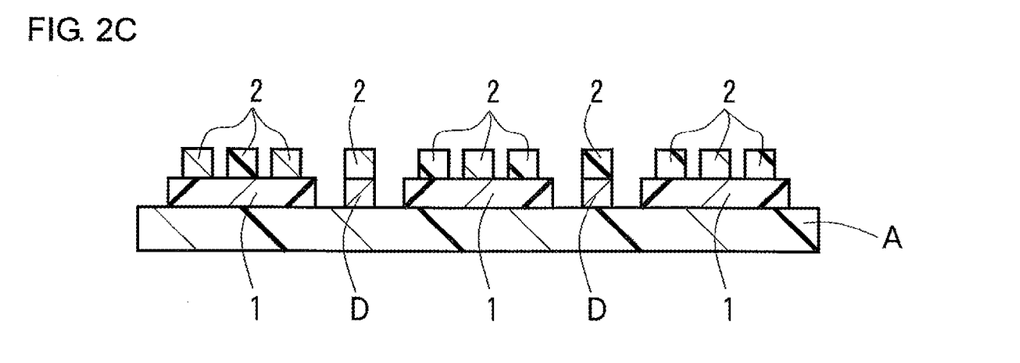
Figure 3A:
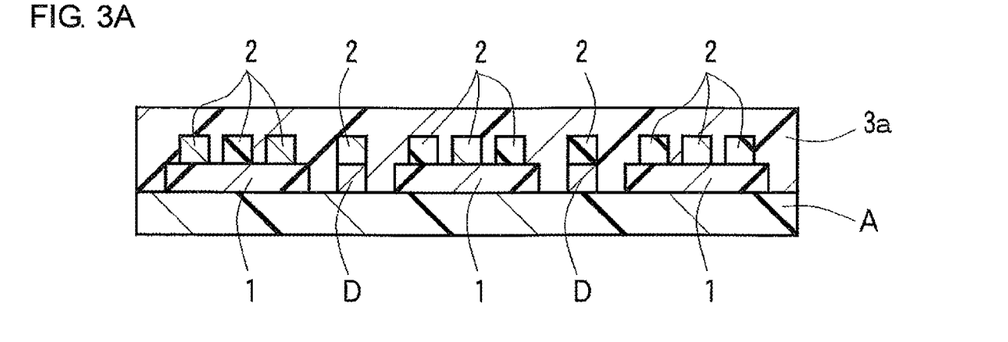
FIGS. 3A to 3C are schematic diagrams for explaining how to form over-cladding layers in the optical waveguide production method according to the embodiment.
Figure 3B:
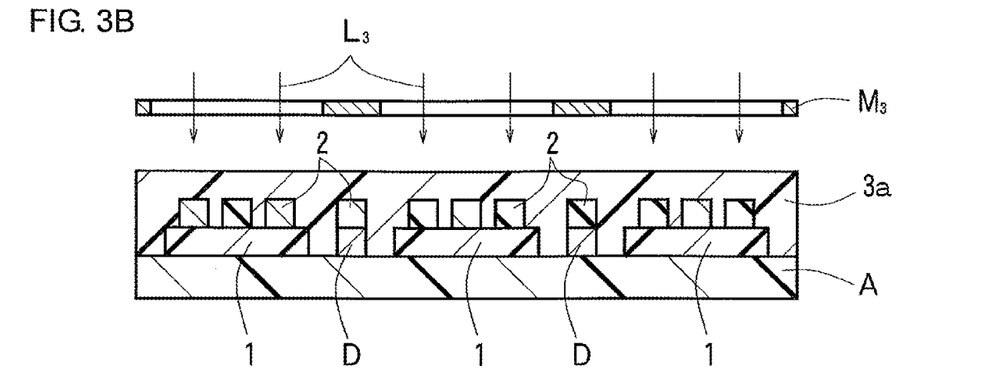
Figure 3C:
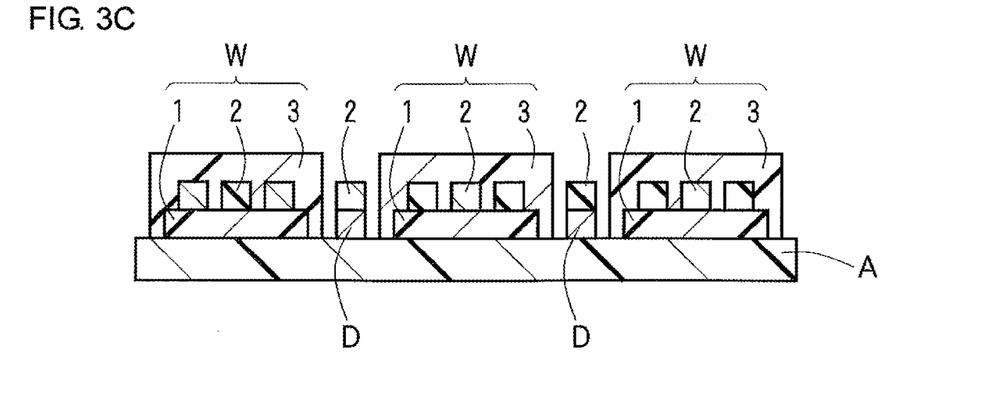
Figure 4:
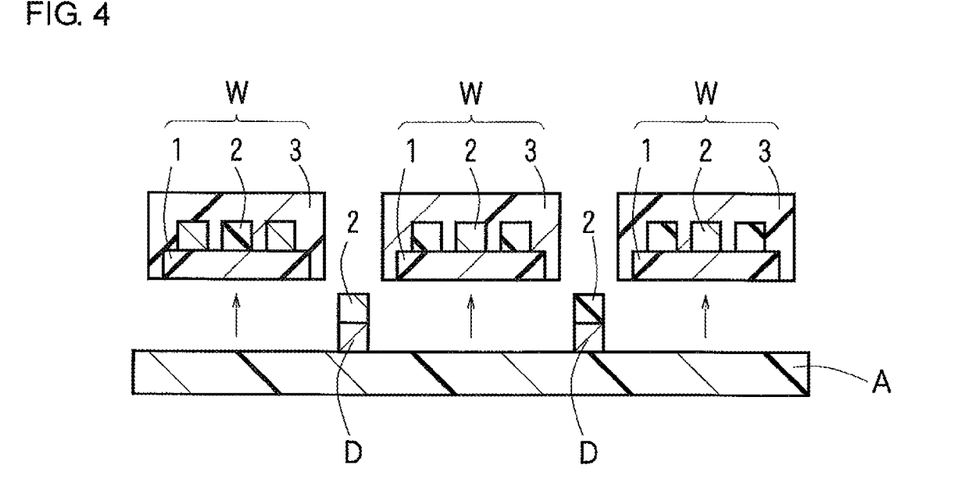
FIG. 4 is a schematic diagram for explaining how to separate optical waveguides from a substrate in the optical waveguide production method according to the embodiment.

FIGS. 1A to 4 show an optical waveguide production method according to the embodiment. The optical waveguide production method according to this embodiment will be briefly described. First, as shown in FIGS. 1A to 1D, a plurality of regions for a plurality of optical waveguides W (see FIG. 3C) are defined on a substrate A. Then, optical waveguide under-cladding layers 1 are formed on the respective regions, and dummy under-cladding layers D are formed between adjacent ones of the optical waveguide under-cladding layers 1 in spaced relation to the optical waveguide under-cladding layers 1. Subsequently, as shown in FIGS. 2A to 2C, a core formation photosensitive resin layer 2a is formed as having a planar upper surface on the resulting substrate in the presence of the dummy under-cladding layers D thus formed, and then selectively exposed, whereby cores 2 are formed in a predetermined pattern as having an even height on upper surfaces of the optical waveguide under-cladding layers 1 and the dummy under-cladding layers D. Then, as shown in FIGS. 3A to 3C, an over-cladding layer formation photosensitive resin layer 3a is formed as having a planar upper surface on the resulting substrate in the presence of the dummy under-cladding layers D and the cores 2 formed on the upper surfaces of the dummy under-cladding layers D, and then selectively exposed, whereby over-cladding layer 3 are formed as each having a planar upper surface over the respective optical waveguide under-cladding layers 1. Thus, the optical waveguides W are produced as each including the under-cladding layer 1, the cores 2 and the over-cladding layer 3 on the respective regions defined on the substrate A. Thereafter, as shown in FIG. 4, the optical waveguides W are individually separated from the substrate A. Thus, the plurality of optical waveguides W are provided.

That is, the over-cladding layers 3 can be formed as each having a planar upper surface in the presence of the dummy under-cladding layers D formed between the adjacent ones of the optical waveguide under-cladding layers 1 and the cores 2 formed on the upper surfaces of the dummy under-cladding layers D in the optical waveguide production method. This obviates the need for the polishing step or the like required in the conventional art for the planarization of the upper surfaces of the over-cladding layers 3, thereby improving the productivity. In the optical waveguide production method, the optical waveguides can be individually provided by separating the optical waveguides W from the substrate A. This obviates the need for the cutting step, improving the productivity. Thus, the optical waveguide production method makes it possible to produce the optical waveguides W each including the planar surface over-cladding layer 3 at higher productivity.

The optical waveguide production method will hereinafter be described in detail.

Figure 1A:
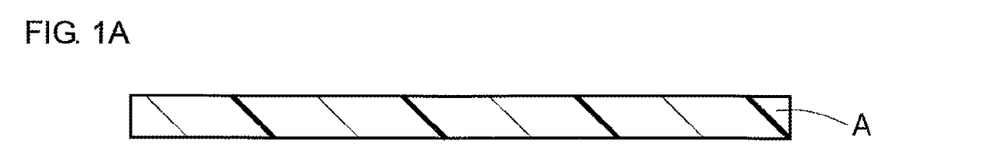
FIGS. 1A to 1D are schematic diagrams for explaining how to form under-cladding layers in an optical waveguide production method according to an embodiment.

First, as shown in FIG. 1A, a substrate A for production of a plurality of optical waveguides W is prepared. Exemplary materials for the substrate A include glass, resins such as polyethylene terephthalates (PETs), polyethylene naphthalates (PENs) and polyimides, and metals such as stainless steel.

Figure 1B:
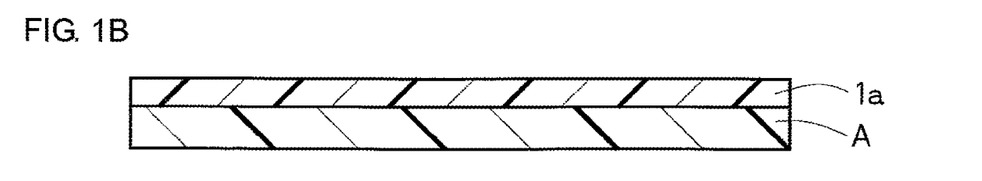

Then, as shown in FIG. 1B, a varnish prepared by dissolving a photosensitive resin as a material for optical waveguide under-cladding layers 1 and dummy under-cladding layers D in a solvent is applied on the entire surface of the substrate A. The application of the varnish is achieved by a spin coating method, a dipping method, a casting method, an injection method, an inkjet method or the like. The resulting varnish coating layer is heat-treated at 50° C. to 120° C. for 10 to 30 minutes to be thereby dried. Thus, a photosensitive resin layer 1a to be formed into the optical waveguide under-cladding layers 1 and the dummy under-cladding layers D is formed as having an even thickness. The thickness of the photosensitive resin layer 1a is typically not less than 5 μm.

Figure 1C:
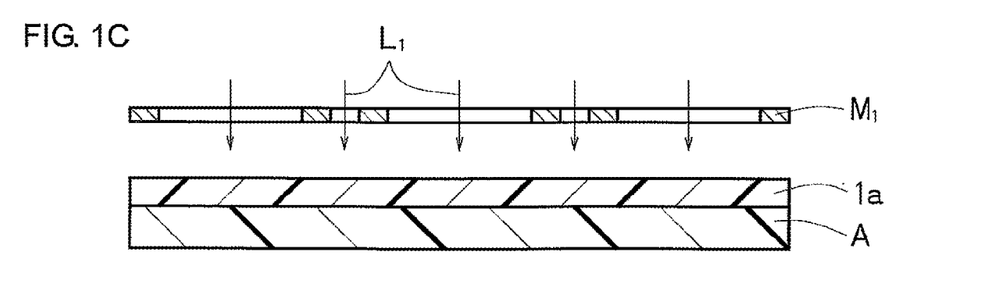

Subsequently, as shown in FIG. 1C, a photomask $M_1$ formed with an opening pattern corresponding to patterns of the optical waveguide under-cladding layers 1 and the dummy under-cladding layers D is placed above the photosensitive resin layer 1a, which is in turn exposed to radiation $L_1$ such as ultraviolet radiation via the photomask $M_1$. The dose of the radiation $L_1$ is typically 10 to 10000 mJ/cm². The exposure is followed by a heat treatment for completion of a photoreaction. The heat treatment is typically performed at 80° C. to 250° C. for 10 seconds to 2 hours.

Figure 1D:
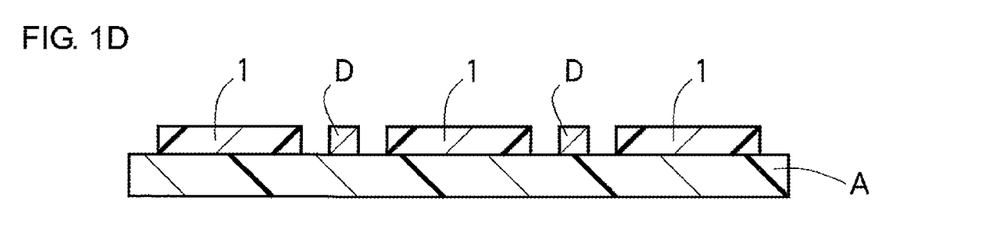

Then, as shown in FIG. 1D, a development process is performed with the use of a developing liquid, whereby unexposed portions of the photosensitive resin layer 1a are dissolved away. Thus, the remaining portions of the photosensitive resin layer 1a are formed in the patterns of the optical waveguide under-cladding layers 1 and the dummy under-cladding layers D. The pattern of the optical waveguide under-cladding layers 1 is such that the optical waveguide under-cladding layers 1 are present on the regions defined on the substrate A for the respective optical waveguides W as previously described. The pattern of the dummy under-cladding layers D is such that the dummy under-cladding layers D are present between adjacent ones of the optical waveguide under-cladding layers 1 in spaced relation to the optical waveguide under-cladding layers 1.

After the development process, the developing liquid is removed from surfaces of the remaining patterned portions of the photosensitive resin layer 1a through a heat treatment. The heat treatment is typically performed at 80° C. to 120° C. for 10 to 30 minutes. Thus, the optical waveguide under-cladding layers 1 and the dummy under-cladding layers D are formed as defined by the remaining patterned portions of the photosensitive resin layer 1a.

The adjacent ones of the optical waveguide under-cladding layers 1 are typically spaced not greater than 400 μm from each other. The dummy under-cladding layers D are each preferably spaced a smaller distance from the adjacent ones of the optical waveguide under-cladding layers 1, and the distance is typically not greater than 300 μm. The optical waveguide under-cladding layers 1 and the dummy under-cladding layers D have the same thickness.

Then, as shown in FIG. 2A, a varnish prepared by dissolving a photosensitive resin as a material for cores 2 in a solvent is applied over the optical waveguide under-cladding layers and the dummy under-cladding layers D on the resulting substrate to form a core formation photosensitive resin layer 2a. The application of the varnish and the formation of the photosensitive resin layer 2a are achieved in substantially the same manner as in the formation of the under-cladding layer formation photosensitive resin layer 1a described with reference to FIG. 1B. At this time, the dummy under-cladding layers D are present between the optical waveguide under-cladding layers 1, so that the core formation photosensitive resin layer 2a has a planar upper surface without the possibility that the photosensitive resin layer 2a is recessed between the optical waveguide under-cladding layers 1. The photosensitive resin layer 2a typically has a thickness of 20 to 80 μm (as measured on the optical waveguide under-cladding layers 1).

Subsequently, as shown in FIG. 2B, a photomask $M_2$ formed with an opening pattern corresponding to a pattern of the cores 2 (see FIG. 2C) is placed above the photosensitive resin layer 2a, which is in turn exposed to radiation $L_2$ such as ultraviolet radiation via the photomask $M_2$. The exposure is followed by a heat treatment. The exposure and the heat treatment are achieved in substantially the same manner as in the formation of the under-cladding layers D described with reference to FIG. 1C.

Then, as shown in FIG. 2C, a development process is performed with the use of a developing liquid, whereby unexposed portions of the photosensitive resin layer 2a are dissolved away. Thus, portions of the photosensitive resin layer 2a remaining on the optical waveguide under-cladding layers 1 and the dummy under-cladding layers D are formed in the pattern of the cores 2. After the development process, the developing liquid is removed from surfaces of the remaining portions of the photosensitive resin layer 2a through a heat treatment. Thus, the cores 2 are formed as defined by the remaining portions of the photosensitive resin layer 2a. The development and the heat treatment are achieved in substantially the same manner as in the formation of the under-cladding layers 1, D described with reference to FIG. 1D. The cores present on the optical waveguide under-cladding layers 1 have a predetermined pattern, and typically each have a width of 20 to 80 μm. The cores 2 present on the dummy under-cladding layers D have the same width as the dummy under-cladding layers D. The cores 2 present on the optical waveguide under-cladding layers 1 and the cores present on the dummy under-cladding layers D have the same height.

Then, as shown in FIG. 3A, a varnish prepared by dissolving a photosensitive resin as a material for over-cladding layers 3 in a solvent is applied over the cores 2 on the resulting substrate to form an over-cladding layer formation photosensitive resin layer 3a. The application of the varnish and the formation of the photosensitive resin layer 3a are achieved in substantially the same manner as in the formation of the under-cladding layer formation photosensitive resin layer 1a described with reference to FIG. 1B. At this time, the dummy under-cladding layers D and the cores 2 formed on the upper surfaces of the dummy under-cladding layers D are present between the optical waveguide under-cladding layers 1, so that the over-cladding layer formation photosensitive resin layer 3a has a planar upper surface without the possibility that the photosensitive resin layer 3a is recessed between the optical waveguide under-cladding layers 1. The photosensitive resin layer 3a typically has a thickness not less than 5 μm (as measured from the upper surfaces of the cores 2).

In turn, as shown in FIG. 3B, a photomask $M_3$ formed with an opening pattern corresponding to a pattern of over-cladding layers 3 (see FIG. 3C) is placed above the photosensitive resin layer 3a, which is in turn exposed to radiation $L_3$ such as ultraviolet radiation via the photomask $N_3$. The exposure is followed by a heat treatment. The exposure and the heat treatment are achieved in substantially the same manner as in the formation of the under-cladding layers 1, D described with reference to FIG. 1C.

Subsequently, as shown in FIG. 3C, a development process is performed with the use of a developing liquid, whereby unexposed portions of the photosensitive resin layer 3a are dissolved away. Thus, portions of the photosensitive resin layer 3a remaining on the optical waveguide under-cladding layers 1 are formed in the pattern of the over-cladding layers 3. Thereafter, the developing liquid is removed from surfaces of the remaining portions of the photosensitive resin layer 3a through a heat treatment. Thus, the over-cladding layers 3 are formed as defined by the remaining portions of the photosensitive resin layer 3a. The development and the heat treatment are achieved in substantially the same manner as in the formation of the under-cladding layers 1, D described with reference to FIG. 1D. The over-cladding layers 3 are formed on the regions in which the optical waveguide under-cladding layers 1 are present.

Thus, the optical waveguides W each including the optical waveguide under-cladding layer 1, the cores 2 and the over-cladding layer 3 can be produced in such a state that the dummy under-cladding layers D and the cores 2 formed on the dummy under-cladding layers D are present between adjacent ones of the optical waveguides W in spaced relation to the optical waveguides W.

Thereafter, as shown in FIG. 4, the optical waveguides W are individually separated from the substrate A. Thus, the optical waveguides W can be individually provided without the cutting. At this time, the dummy under-cladding layers D and the cores 2 formed on the upper surfaces of the dummy under-cladding layers D remain on the substrate A.

An exemplary method for the separation is to bring a lower surface of the substrate A into abutment against a vacuum suction stage to fix the substrate A to the vacuum suction stage by air suction, and suck and lift an upper surface of each of the over-cladding layers by a vacuum sucker. In this method, an optical waveguide W including the sucked over-cladding layer 3, the corresponding cores 2 and the corresponding under-cladding layer 1 combined together is separated from the substrate A. Here, an adhesive force between the substrate A and the under-cladding layer 1 and an adhesive force between the substrate A and the over-cladding layer 3 are weaker than an adhesive force between the over-cladding layer 3 and the cores 2, an adhesive force between the over-cladding layer 3 and the under-cladding layer 1 and an adhesive force between the cores 2 and the under-cladding layer 1 due to the materials for these components, so that the optical waveguide can be easily separated from the substrate A by the separation method described above.

FIGS. 5A to 5D shows an optical waveguide production method according to another embodiment. In this embodiment of an optical waveguide production method, an optical waveguide is produced in substantially the same manner as in the embodiment described above (see FIGS. 1A to 4), except that a plurality of cores 2 are formed on the upper surface of the respective dummy under-cladding layers D (see FIG. 5B; the references are in common with FIGS. 1A to 4). By adjusting a space (slit width) 1 (see FIG. 5B) between ones of the plurality of cores 2 adjacent to each other on the upper surface of the dummy under-cladding layer D, this embodiment also achieves an effect of enabling the planarization of the upper surfaces of the over-cladding layers 3 without a polishing step and the like as in the embodiment described above.

Figure 5A:
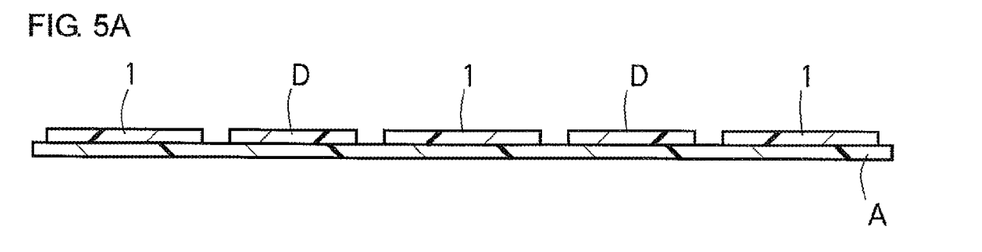
FIGS. 5A to 5D are schematic diagrams for explaining the optical waveguide production method according to another embodiment.
Figure 5B:
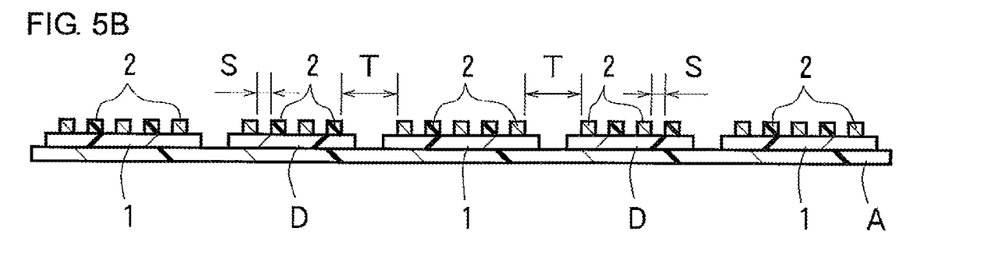

In this embodiment, the planarization effect is particularly achieved when an optical waveguide W has a large width. In particular, the effect is especially achieved when the space T (core interval) between a core 2 on the under-cladding layer 1 on one periphery thereof and a core 2 on the dummy under-cladding layer D on one periphery thereof opposing the one periphery of the optical waveguide under-cladding layer is set to be within a range from 200 μm to 600 μm.

Figure 5C:
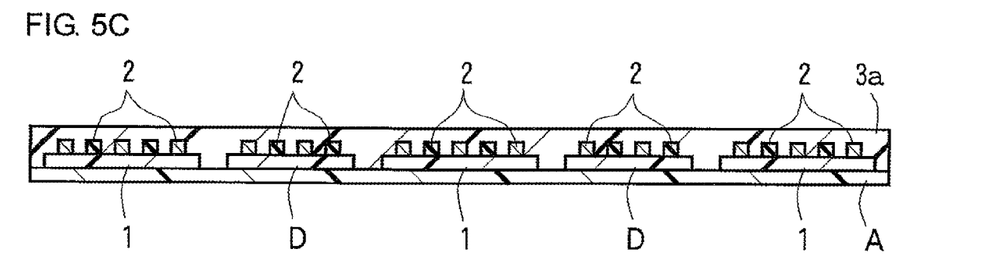
Figure 5D:
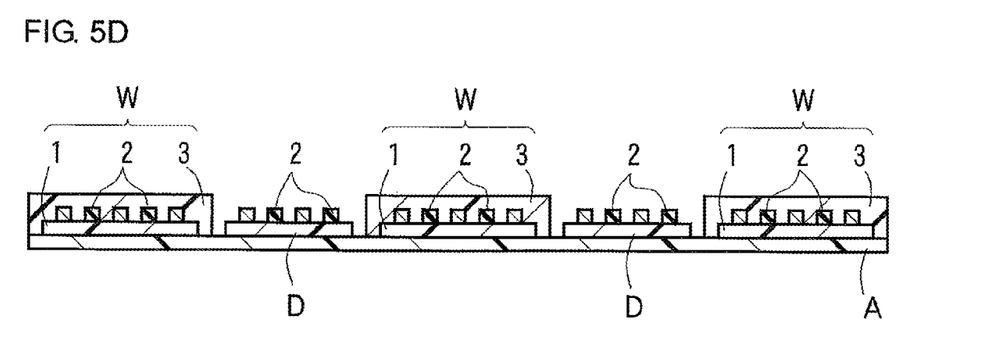

The optical waveguide production method of this embodiment is described. First, as shown in FIG. 5A, optical waveguide under-cladding layers 1 and dummy under cladding layers D are formed on a substrate A in substantially the same manner as in the embodiment described above (see FIGS. 1A to 1D). Then, as shown in FIG. 5B, a plurality of cores 2 are formed on the upper surface of each optical waveguide under-cladding layers 1 and the upper surface of each dummy under-cladding layers D in substantially the same manner as in the embodiment described above (see FIGS. 2A to 2C). In the presence of the dummy under-cladding layers D, these cores 2 are formed to have an even height as in the embodiment described above. The space S between the adjacent cores 2 on the dummy under-cladding layer D is preferably within a range from 100 μm to 300 μm from the objective to improve the planarity of the upper surface of an over cladding layer formation photosensitive resin layer 3a, which is formed in the subsequent step (see FIG. 5C). Next, as shown in FIG. 5C, an over cladding layer formation photosensitive resin layer 3a is formed in substantially the same manner as in the embodiment described above (see FIG. 3A). In the presence of the dummy under-cladding layers D and the plurality of cores 2, the over-cladding layer formation photosensitive resin layer 3a has a planar upper surface as in the embodiment described above. Then, as shown in FIG. 5D, the over-cladding layer formation photosensitive resin layer 3a is selectively exposed and then developed in substantially the same manner as in the embodiment described above (see FIGS. 3B and 3C) so that the optical waveguides W each including the optical waveguide under-cladding layer 1, the cores 2 and the planar over-cladding layer 3 can be produced on the substrate A. Thereafter, the optical waveguides W are individually separated from the substrate A in substantially the same manner as in the embodiment described above (see FIG. 4).

In each of the embodiments described above, the optical waveguide under-cladding layers 1 and the dummy under-cladding layers D are simultaneously formed from the single photosensitive resin layer 1a by the photolithography process, but some other process may be employed for the formation of the optical waveguide under-cladding layers 1 and the dummy under-cladding layers D. For example, the optical waveguide under-cladding layers 1 may be first formed by the patterning, and then the dummy under-cladding layers D may be formed from a material different from the material for the optical waveguide under-cladding layers 1 between adjacent ones of the optical waveguide under-cladding layers 1.

In the optical waveguide production method, examples of the photosensitive resins to be used as the materials for the optical waveguide under-cladding layers 1, the cores 2 and the over-cladding layers 3 include epoxy resins and acryl resins. Examples of the solvents to be used for dissolving the photosensitive resins include ethyl lactate, cyclohexanone and methyl ethyl ketone. The solvents may be each used in a proportion of 10 to 80 parts by weight based on 100 parts by weight of the photosensitive resin. The material for the cores 2 has a higher refractive index than the materials for the optical waveguide under-cladding layers and the over-cladding layers 3. The refractive indexes may be adjusted, for example, by properly selecting the types of the materials for the optical waveguide under-cladding layers 1, the cores and the over-cladding layers 3 and adjusting the formulations of the materials.

Even if the optical waveguides W each have a complicated shape in each of the embodiments described above, the optical waveguides W can be easily produced by properly forming the opening patterns in the photomasks $M_1$, $M_2$ and $M_3$. In addition, the productivity is not reduced, because the optical waveguides W each having the complicated shape can be individually provided by separating the optical waveguides W from the substrate A.

Next, inventive examples will be described in conjunction with a prior-art example. However, it should be understood that the present invention be not limited to the inventive examples.

EXAMPLES

Under-Cladding Layer Material for Optical Waveguide Under-Cladding Layers and Dummy Under-Cladding Layers and Over-Cladding Layer Material Component A (solid epoxy resin): an epoxy resin containing an aromatic ring skeleton (EPICOAT 1002 available from Mitsubishi Chemical Corporation)
Component B (solid epoxy resin): an epoxy resin containing an alicyclic skeleton (EHPE 3150 available from Daicel Chemical Industries, Ltd.)
Component C (photoacid generator): a 50% propylene carbonate solution of a triarylsulfonium salt (CPI-200K available from San-Apro Ltd.)

A photosensitive resin composition was prepared as an under-cladding layer material and an over-cladding layer material by dissolving 70 parts by weight of Component A, 30 parts by weight of Component B, and 2 parts by weight of Component C in 55 parts by weight of ethyl lactate (available from Musashino Chemical Laboratory, Ltd.) with stirring at a temperature of 80° C. at a stirring speed of 250 rmp for 3 hours. The photosensitive resin composition thus prepared had a viscosity of 1320 mPa·s as measured by a Brookfield's digital viscometer (HBDV-I+CP).

[Core Material]
Component D: o-cresol novolak glycidyl ether (YDCN-700-10 available from Nippon Steel Chemical Co., Ltd.)

A photosensitive resin composition was prepared as a core material by dissolving 100 parts by weight of Component D and 1 part by weight of Component C in 60 parts by weight of ethyl lactate (available from Musashino Chemical Laboratory, Ltd.) with stirring at a temperature of 80° C. at a stirring speed of 250 rmp for 3 hours. The photosensitive resin composition thus prepared had a viscosity of 1900 mPa·s as measured by the digital viscometer described above.

Example 1

Formation of Optical Waveguide Under-Cladding Layers and Dummy Under-Cladding Layers The under-cladding layer material was applied onto a surface of a glass substrate (available from Central Glass Co., Ltd. and having a size of 140 mm×140 mm×1.1 mm (thickness)) by means of a spin coater (1X-DX2 available from Mikasa Co., Ltd.) and dried at 130° C. for 10 minutes to form an under-cladding layer formation photosensitive resin layer. In turn, the photosensitive resin layer was irradiated with ultraviolet radiation (at a wavelength of 365 nm) at a cumulative dose of 2000 mJ/cm² by means of an exposure machine (MA-60F available from Mikasa Co., Ltd.) and an ultra-high pressure mercury lamp (USH-250D available from Ushio Inc.) for exposure, and then heat-treated at 130° C. for 10 minutes. Thereafter, a development process (dipping development process) was performed by dipping the resulting photosensitive resin layer in a developing liquid of γ-butyrolactone (available from Mitsubishi Chemical Corporation) for 3 minutes, whereby unexposed portions of the photosensitive resin layer were dissolved away. Then, the resulting photosensitive resin layer was heat-treated at 120° C. for minutes. Thus, linear optical waveguide under-cladding layers and linear dummy under-cladding layers were formed as spaced 300 µm from each other (see FIG. 1D).

[Formation of Cores]

Next, the core material was applied over the optical waveguide under-cladding layers and the dummy under-cladding layers on the resulting substrate by means of the spin coater, and then dried at 130° C. for 5 minutes to form a core formation photosensitive resin layer. In turn, the photosensitive resin layer was exposed via a photomask by irradiation with ultraviolet radiation (at a wavelength of 365 nm) at a cumulative dose of 4000 mJ/cm² by means of the exposure machine and the ultra-high pressure mercury lamp, and then heat-treated at 130° C. for 15 minutes. Thereafter, a development process (dipping development process) was performed by dipping the resulting photosensitive resin layer in a developing liquid of γ-butyrolactone (available from Mitsubishi Chemical Corporation) for 3 minutes, whereby unexposed portions of the photosensitive resin layer were dissolved away. Then, the resulting photosensitive resin layer was heat-treated at 120° C. for 10 minutes. Thus, linear cores were formed on the optical waveguide under-cladding layers and the dummy under-cladding layers (see FIG. 2C).

[Formation of Over-Cladding Layers]

The over-cladding layer material was applied over the cores on the resulting substrate by means of the spin coater to form an over-cladding layer formation photosensitive resin layer, and then heat-treated at 130° C. for 10 minutes. In turn, the resulting photosensitive resin layer was exposed via a photomask by irradiation with ultraviolet radiation (at a wavelength of 365 nm) at a cumulative dose of 2000 mJ/cm² by means of the exposure machine and the ultra-high pressure mercury lamp, and then heat-treated at 130° C. for 10 minutes. Thereafter, a development process (dipping development process) was performed by dipping the resulting photosensitive resin layer in a developing liquid of γ-butyrolactone (available from Mitsubishi Chemical Corporation) for 3 minutes, whereby unexposed portions of the photosensitive resin layer were dissolved away. Then, the resulting photosensitive resin layer was heat-treated at 120° C. for minutes. Thus, over-cladding layers were respectively formed over the optical waveguide under-cladding layers (see FIG. 3C).

Thereafter, the optical waveguide under-cladding layers were individually separated from the glass substrate, whereby film-shaped connector optical waveguides each including the optical waveguide under-cladding layer, the cores and the over-cladding layer were produced (see FIG. 4). Then, the connector optical waveguides were each bonded onto a dicing tape (UE-111AJ available from Nitto Denko Corporation), and cut to a length of 100 mm at a cutting rate of 0.3 mm/second by means of a dicing saw (DAD522 available from Disco Corporation) and a dicing blade (NBC-Z2050 available from Disco Corporation and having a size of 50.6×0.025×40 mm), whereby longitudinally opposite end faces of the linear cores were exposed.

Example 2

Connector optical waveguides each having a length of 100 mm were produced in substantially the same manner as in Example 1, except that the optical waveguide under-cladding layers were spaced 150 μm from the dummy under-cladding layers.

Comparative Example

Connector optical waveguides each having a length of 100 mm were produced in substantially the same manner as in Example 1, except that the under-cladding layer formation photosensitive resin layer was not patterned, i.e., the dummy under-cladding layers were not formed, but a single under-cladding layer was formed on the substrate.

[Measurement of Overall Thickness]

The total thickness of the optical waveguide under-cladding layer, the core and the over-cladding layer of each of the connector optical waveguides of Examples 1 and 2 and Comparative Example (the overall thickness of each of the connector optical waveguides of Examples 1 and 2 and Comparative Example) was measured at 12 sites (through Channels #1 to #12) with a microscope (VHX-200 available from Keyence Corporation). Further, a difference between a maximum value and a minimum value of the overall thicknesses thus measured was calculated. The results are shown below in Table 1.

TABLE 1

|  | Example 1 | Example 2 | Comparative Example |
|---|---|---|---|
| Distance (μm) between optical waveguide under-cladding layer and dummy under-cladding layer | 300 | 150 | — |
| Overall thickness (μm) | | | |
| Channel #1 | 98.29 | 100.07 | 87.97 |
| Channel #2 | 98.03 | 100.67 | 93.78 |
| Channel #3 | 99.22 | 101.72 | 96.27 |
| Channel #4 | 101.25 | 104.22 | 98.39 |
| Channel #5 | 102.86 | 104.22 | 100.47 |
| Channel #6 | 103.26 | 103.81 | 101.31 |
| Channel #7 | 102.57 | 104.01 | 100.49 |
| Channel #8 | 102.14 | 104.07 | 97.98 |
| Channel #9 | 101.95 | 102.98 | 98.07 |
| Channel #10 | 101.31 | 101.31 | 93.39 |
| Channel #11 | 101.31 | 100.21 | 90.05 |
| Channel #12 | 98.14 | 98.78 | 85.46 |
| Maximum − Minimum (μm) | 5.23 | 4.44 | 15.85 |

The results shown in Table 1 indicate that the optical waveguides produced by the production methods of Examples 1 and 2 each involving the formation of the dummy under-cladding layers and the formation of the cores on the surfaces of the dummy under-cladding layers had smaller variations in overall thickness than the optical waveguides produced by the production method of the comparative example.

Examples 3 to 11

Connector optical waveguides each having a length of 100 mm were produced in substantially the same manner as in Example 1, except that an optical waveguide under-cladding layer was spaced 200 μm from a dummy under-cladding layer and that four cores were formed on the upper surface of each dummy under-cladding layer (see FIG. 5B). As shown in Table 2, the adjacent cores on the upper surface of a dummy under-cladding layer were formed to have a space (slit width) of 100 μm, 200 μm or 300 μm from each other. A space (core interval) between a core on an optical waveguide under-cladding layer on one periphery thereof and a core on a dummy under-cladding layer on one periphery thereof opposing the one periphery of the optical waveguide under-cladding layer was set to be 200 μm, 400 μm and 600 μm.

[Measurement of Overall Thickness]

The overall thickness of each of the connector optical waveguides of Examples 3 to 11 was measured with the microscope (VHX-200 available from Keyence Corporation). The overall thickness was measured at the left end portions, the central portions and the right end portions of the connector optical waveguides being formed on the both right and left side of a dummy under-cladding layer. Further, a standard deviation of the overall thicknesses thus measured was calculated. The results are shown below in Table 2.

TABLE 2

| | | Slit width | Core interval | Overall thickness of left side optical waveguide | | | Overall thickness of right side optical waveguide | | | Standard deviation (σ) |
|---|---|---|---|---|---|---|---|---|---|---|
| | | | | Left end portion | Central portion | Right end portion | Left end portion | Central portion | Right end portion | |
| Ex. | 3 | 100 | 200 | 98.92 | 95.13 | 112.46 | 105.05 | 94.59 | 100.00 | 6.8 |
| | 4 | | 400 | 105.43 | 97.29 | 96.21 | 94.22 | 93.87 | 94.97 | 4.3 |
| | 5 | | 600 | 91.35 | 95.85 | 89.00 | 89.72 | 97.29 | 94.05 | 3.4 |

TABLE 2-continued

| | | | Overall thickness of left side optical waveguide | | | Overall thickness of right side optical waveguide | | | Standard |
|---|---|---|---|---|---|---|---|---|---|
| | Slit width | Core interval | Left end portion | Central portion | Right end portion | Left end portion | Central portion | Right end portion | deviation ($\sigma$) |
| 6 | 200 | 200 | 100.90 | 94.04 | 95.13 | 95.86 | 96.58 | 104.54 | 4.0 |
| 7 | | 400 | 95.67 | 99.30 | 95.92 | 90.07 | 94.95 | 96.57 | 3.0 |
| 8 | | 600 | 82.68 | 87.55 | 88.28 | 84.30 | 93.68 | 88.10 | 3.8 |
| 9 | 300 | 200 | 99.10 | 95.49 | 92.28 | 91.53 | 94.59 | 90.61 | 3.1 |
| 10 | | 400 | 100.18 | 100.91 | 96.59 | 91.52 | 98.57 | 91.52 | 4.2 |
| 11 | | 600 | 85.43 | 92.44 | 85.21 | 88.10 | 95.53 | 86.65 | 4.2 |

(Unit: μm)

The results shown in Table 2 indicate that the optical waveguides produced by the production methods of Examples 3 to 11 each involving the formation of the plurality of cores on the surface of the respective dummy under-cladding layers had smaller variations in overall thickness.

As described above, the inventive optical waveguide production method is useful for producing a plurality of optical waveguides.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An optical waveguide production method for producing a plurality of optical waveguides, the method comprising:
   defining a plurality of regions for the plurality of optical waveguides on a substrate;
   forming optical waveguide under-cladding layers on the respective regions and forming dummy under-cladding layers between adjacent ones of the optical waveguide under-cladding layers in a spaced relationship through application and exposure of an under-cladding layer formation photosensitive resin;
   forming cores on the optical waveguide under-cladding layers and the dummy under-cladding layers through application and exposure of a core formation photosensitive resin;
   applying an over-cladding layer formation photosensitive resin over the cores to form a photosensitive resin layer;
   selectively exposing portions of the over-cladding layer formation photosensitive resin layer without exposing portions of the over-cladding layer formation photosensitive resin layer corresponding to the dummy under-cladding layers and defining the exposed portions as over-cladding layers, whereby the optical waveguides are formed, each including the optical waveguide under-cladding layer, the core and the over-cladding layer on the substrate, whereby the portions corresponding to the dummy under-cladding layers do not contain the over-cladding layer; and
   selectively separating the optical waveguides from the substrate without separating the dummy under-cladding layers from the substrate.

2. The optical waveguide production method according to claim 1, wherein the dummy under-cladding layers are each spaced not greater than 300 μm from an adjacent one of the optical waveguide under-cladding layers.

3. The optical waveguide production method according to claim 1, wherein a plurality of cores are formed on the surface of the dummy under-cladding layer.

4. The optical waveguide production method according to claim 2, wherein a plurality of cores are formed on the surface of the dummy under-cladding layer.

5. The optical waveguide production method according to claim 1, wherein the optical waveguide under-cladding layers and the dummy under-cladding layers are formed in the same step.

6. The optical waveguide production method according to claim 2, wherein the optical waveguide under-cladding layers and the dummy under-cladding layers are formed in the same step.

7. The optical waveguide production method according to claim 3, wherein the optical waveguide under-cladding layers and the dummy under-cladding layers are formed in the same step.

* * * * *